United States Patent
McCormick

[11] 3,788,317
[45] Jan. 29, 1974

[54] POROUS ABSORBENT PAD ELECTRODE FOR USE WITH AN ELECTROCARDIOGRAPH INSTRUMENT OR THE LIKE

[75] Inventor: James B. McCormick, Hinsdale, Ill.

[73] Assignee: Pelam, Inc., Hinsdale, Ill.

[22] Filed: Jan. 12, 1972

[21] Appl. No.: 217,192

[52] U.S. Cl.......... 128/2.06 E, 128/417, 128/DIG. 4
[51] Int. Cl................................................ A61b 5/04
[58] Field of Search ...... 128/2.06 E, 2.1 E, 172.1, 128/404–406, 417, 418, DIG. 4

[56] References Cited
UNITED STATES PATENTS

| | | | |
|---|---|---|---|
| 3,610,229 | 10/1971 | Zenkich | 128/2.06 E |
| 3,565,059 | 2/1971 | Hauser | 128/2.06 E |
| 3,170,459 | 2/1965 | Phipps et al. | 128/2.06 E |
| 3,474,775 | 10/1969 | Johnson | 128/2.1 E |
| 3,187,745 | 6/1965 | Baum et al. | 128/2.06 E |
| 3,534,733 | 10/1969 | Phipps et al. | 128/2.1 E |
| 2,895,479 | 7/1959 | Lloyd | 128/417 |
| 1,625,675 | 4/1927 | Noishiki | 128/172.1 |

Primary Examiner—William E. Kamm
Attorney, Agent, or Firm—William E. Anderson et al.

[57] ABSTRACT

An electrode is provided for use with an instrument such as an electrocardiograph which employs a normally dry absorbant pad formed of a porous material and a cup supported above the pad, the cup being provided with passageways through which fluid may pass from the interior of the cup to the pad. In a preferred embodiment, the pad is impregnated with a material in a dry state which becomes electrically conductive when in solution with a selected liquid placed in the cup, and will expand when it absorbs the liquid to provide an intimate contact between the skin and the electrically conductive cup. Means are provided for connecting the cup to the appropriate recording instrument.

9 Claims, 5 Drawing Figures

PATENTED JAN 29 1974 3,788,317
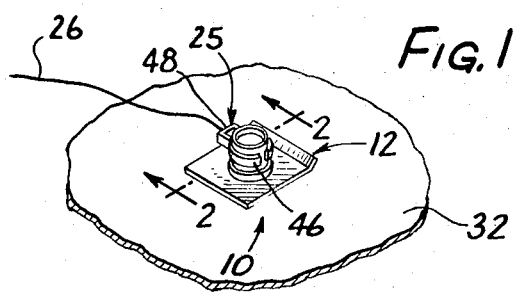
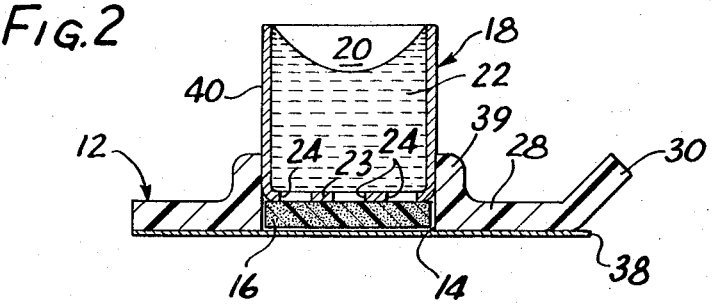
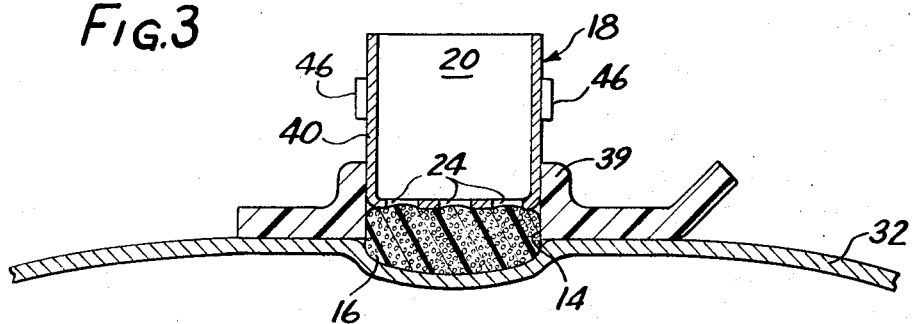
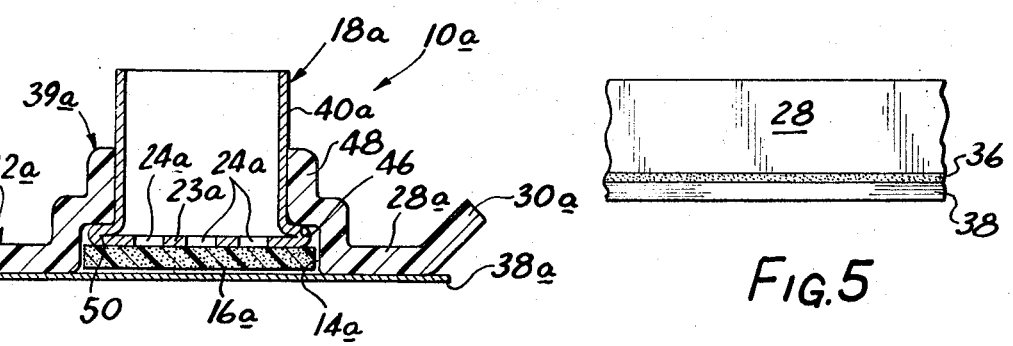
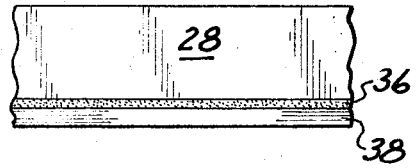

POROUS ABSORBENT PAD ELECTRODE FOR USE WITH AN ELECTROCARDIOGRAPH INSTRUMENT OR THE LIKE

The present invention relates to electrodes adapted to be attached to the skin of the human body to pick up electrical impulses from the body and convey them to an electrocardiograph instrument or the like.

The principal object of the present invention is to provide an improved electrode of the type referred to above.

Another object of the invention is to provide such an electrode which does not require the use of electrically conductive gelatins applied to the surface of the skin.

A more specific object of the invention is to provide such an electrode which achieves an electrical connection between the skin and the instrument by means of an electrically conductive liquid bridge.

These and other objects of the invention will become apparent with reference to the following description and the accompanying drawing.

In the drawings:

FIG. 1 is a perspective view of an electrode showing various of the features of the invention as the electrode might appear attached to the skin of the subject undergoing test;

FIG. 2 is an enlarged sectional elevational view taken generally along line 2—2 of FIG. 1 but showing the electrode of FIG. 1 as it might appear prior to being attached to the skin;

FIG. 3 is a sectional elevational view similar to that of FIG. 2 but showing the electrode as it appears in an operative form;

FIG. 4 is a sectional elevational view similar to that of FIG. 2 but showing an alternate embodiment of the invention; and FIG. 5 is an enlarged fragmentary elevational view of a portion of the electrode as shown in FIG. 2.

Very generally, there is illustrated in the drawing an electrode 10 including a supporting plate 12 having an opening 14 extending therethrough. Disposed within the opening 14 is a normally dry porous pad 16 in a compressed state and impregnated with a material, such as a salt, which will form an electrically conductive solution when mixed with a selected liquid, such as water. Because of its compressed state, the pad 16 will expand or swell when moistened. Supported by the plate 12 above the pad 16 with its bottom wall in intimate contact with the upper surface of the pad is a cup 18 formed of an electrically conductive material. The cup defines a reservoir 20 for a quantity 22 of liquid and has a bottom wall 23 provided with at least one passageway 24 through which liquid can flow into the pad 16, causing the pad to swell into pressure contact with both the bottom wall of the cup and the skin, and also causing the material impregnating the pad to go into solution, thereby creating a salt bridge of low electrical resistance between the cup 18 and the skin. A connector 25 is provided to connect the cup 18 by means of a suitable conductor 26 to an electrocardiograph or other appropriate instrument (not shown).

More specifically, the plate 12 is generally rectangular in shape and is preferably molded of a semi-rigid plastic, such as polypropylene, to provide a cup-supporting portion 28 which has a flat planar lower surface and an upwardly inclined edge portion 30 which facilitates placing the electrode onto, and removing it from, the skin 32 of the patient or subject. The cup-supporting portion 28 is generally square in configuration and it is contemplated that it be relatively small, e.g., in the order of 1.5 cm in length along each edge. An adhesive coating 36 (FIG. 5) is provided on the lower surface of the cup-supporting portion 28 to facilitate attachment thereof to the skin, and a readily removable cover sheet 38, preferably provided with a silicone coating, overlies the adhesive coating to protect it until it is needed.

The opening 14 is located generally centrally of the cup-supporting portion 28 and extends therethrough. The plate 28 is molded to provide a collar 39 encircling the opening 14 at the upper end thereof. In the embodiment of FIGS. 2 and 3, the collar 39 has the same internal diameter as the hole 14 so that the internal surface of the collar constitutes, in effect, an extension of the walls of the opening 14. The collar is adapted to support the cup 18 relative to the plate 12, as will hereinafter become apparent.

Disposed within the opening 14 is the absorbant pad 16 which, in a preferred embodiment, is formed of a porous spongelike material impregnated with a material, such as a salt, which will provide an electrically conductive solution when combined with a selected liquid, such as water. In addition, the pad 16 is preferably impregnated with a wetting agent to facilitate the dissolving of the conductive material in the liquid. The pad is preferably in a compressed form when dry so that it will expand or swell significantly as it absorbs the liquid.

In one contemplated method of forming the pad 16, a sheet of suitable porous material, such as a soft spongy sheet of cellulose acetate, is saturated with an aqueous solution of a salt such as ammonium chloride and with a wetting agent such as one of those sold under the trademark TWEEN. The sheet is then compressed and the water allowed to evaporate while the sheet is in the compressed state. The dry sheet is then cut into small pieces of appropriate size and configuration.

In the illustrated embodiment, the pad 16 is in the form of a flat circular disc having a diameter closely approximating the diameter of the opening 14 and having a thickness approximating the thickness of the cup-supporting portion 28 of the plate 12. Thus, when the cup 18 is positioned on top of the pad 16, as contemplated, the pad is contained laterally by the side walls of the opening 14 and from above by the bottom wall 23 of the cup. Accordingly, when liquid is added to the pad so as to cause the pad to swell, the pad will expand in the direction of the skin as well as against the lower surface of the cup and thereby provide an intimate contact between the pad and the skin and the pad and the cup. Since the pad is saturated with a salt solution, it provides a salt bridge of low resistance between the cup and the skin.

When packaged for distribution, the pad 16 may be maintained in the opening 14 by the cup from above and by the protective sheet 38 from below, or may be held to the lower surface of the cup by an adhesive. In the latter instance, there is less possibility of the pad being displaced when the cover sheet 38 is removed.

The cup 18 is formed of a conductive material and may, for example, be formed of metal or an electroplated, metal-coated plastic. It includes generally cylindrical side walls 40 in addition to the bottom wall 23, the walls 40 and 23 cooperating to define the liquid reservoir 20. The cup is open at its upper end. The bottom wall 23 is provided with the aforementioned passageways 24 which extend through the bottom wall and provide the means whereby a quantity of liquid 22 in the cup may flow downwardly into the pad 16. The cup is typically 5 to 6 mm in diameter and may have a capacity of one-fourth cubic centimeter of liquid. The passageways 24 have a diameter sufficient to permit free flow of liquid therethrough. If desired, a single large passageway may be provided.

The cup 18 is dimensioned relative to the bore of the collar 39 so that it can be forced into the bore of the collar and will be held tightly therein by friction. Accordingly, it will not be displaced by forces exerted by the pad 16 as it expands but, on the contrary, the bottom of the cup will serve as a stop against which the pad expands in the direction of the skin. The cup is preferably assembled with the plate 12 prior to packaging of the electrode, with the pad secured to the cup by a suitable adhesive and with the cover sheet 38 underlying the cup-supporting portion of the plate and the pad.

The electrodes may be packaged separately in assembled or disassembled form, or a set containing the quantity normally used for a given test, e.g., a set of 10 for an electrocardiograph test, may be mounted on a card in assembled form.

In the use of the form of electrode 10 illustrated in FIGS. 2 and 3, an electrode assembly as illustrated in FIG. 2 is obtained either directly from a package or by the assembly of certain components thereof. The sheet 38 is removed from the under surface of the cup-supporting portion 28 of the plate 12 to expose the adhesive coating 36. The electrode is then grasped along the edge portion 30 and placed on the skin of the body at an appropriate location. Other electrodes to be used are similarly placed until all electrodes have been properly positioned. Water or another suitable liquid is then placed in each of the cups 18, from which it will flow into the compressed pad 16 and mix with the salt or other material with which the pad is impregnated, such mixing being aided by the action of a wetting agent. As the compressed pad becomes moistened, it swells and expands against the bottom wall 23 of the cup and against the surface of the skin beneath the opening 14, thereby creating a salt bridge between the cup and skin and insuring an intimate engagement between the pad and both the cup and skin.

Connectors 25 are attached to the cups 18 of the electrodes to couple the electrodes with the appropriate recording instrument (not shown). In the illustrated embodiment, each connector is in the form of a resilient strip bent to provide a pair of arms 46 interconnected by a web 48. The arms 46 are curved so as to conform to the contour of the side walls of the cup 18, and the web is effective to bias the arms inwardly toward each other against the walls of the cup to insure an intimate engagement therebetween. A conductor 26 extends from the connector 24 to the appropriate recording instrument.

There is illustrated in FIG. 4 an electrode 10a which represents an alternate embodiment of the electrode 10 illustrated in FIGS. 2 and 3 and which includes a plate 12a having a cup-supporting portion 28a and an offset edge portion 30a, as did the plate 12 previously described. In addition, the plate 12a includes an opening 14a and a collar 39a which extends upwardly from the periphery of the opening 14a.

The collar 39a is not identical to the collar 39. Whereas the latter includes a generally cylindrical bore, the collar 39a extends upwardly a short distance, then projects inwardly to define a downwardly facing shoulder 46, and then extends upwardly again to provide a neck 48.

The collar 39a receives a cup 18a which also differs some from the cup 18. It includes side walls 40a and a bottom wall 23a provided with passageways 24a. In addition, however, it is provided with a laterally directed peripheral flange 50 at its lower end, the upper surface of which is adapted to abut against the shoulder 46 of the collar to thus locate the cup more precisely relative to the plate, and to insure that the cup will not be displaced upwardly from the expansive force of the swelling pad. In assembling the electrode 10a, the cup is inserted through the opening 14a from beneath, a compressed impregnated pad 16a is then placed in the opening 14a and preferably adhesively bonded to the cup, after which a cover sheet 38a is applied to protect an adhesive coating (not shown). The electrode 10a is used in the same manner as the electrode 10, i.e., by applying it to the skin and then adding liquid to the cup 18a.

While certain specific embodiments of the invention have been shown and described, it should be apparent that various structural modifications may be made without departing from the scope of the invention. For example, it may be found most efficient to mold the entire electrode as a single piece from a conductive material, or to provide means other than the illustrated connectors 25, such as alligator clips, for electrically coupling the electrode to the recording instrument.

It should also be apparent that variations may be made in the manner in which the electrode is used. For example, it may prove satisfactory to employ a pad 16 which is compressed but not impregnated and to then add to the cup an electrically conductive solution which will saturate the pad and cause it to swell. Alternatively, the solution employed need not be a salt solution, it being necessary only that it provide the desired conductivity without causing irritation of the skin. If the pad is impregnated, the material with which it is impregnated will desirably go easily and quickly into solution. Preferably, the amount of material with which the pad is impregnated will be sufficient to form a solution having a percent of saturation which will provide the desired degree of conductivity. The liquid added need not be water, although the use of water would be most convenient for the user. Nevertheless, if the most satisfactory results could be achieved with a pad impregnated with a material more readily soluble in a solvent other than water, such a solvent might be more appropriately used. The solvent should not be such as would dissolve or weaken the effectiveness of the adhesive coating 36 or any adhesive which might be used to bond the pad to the bottom wall of the cup, although insofar as the bonding of the pad to the cup is concerned, it would not reduce the operability of the electrode if the adhesive were to lose its effectiveness since the electrode would have been properly placed and the adhesive would have served its main function prior to being contacted by the solvent. If the adhesive bond between the pad and cup retains its effectiveness, however, the pad would remain attached to the electrode when the electrode is removed from the skin, thus rendering the overall use of the electrode more convenient for the technician.

It should be apparent that the entire electrode can be manufactured and distributed at a relatively low cost and that it is therefore intended that it be discarded after a single use. The electrode eliminates the use of electrically conductive gelatins presently employed and is therefore believed to possess advantages over electrodes which employ such gelatins since the necessity of cleansing the skin after the use of the electrode is eliminated or, at least, rendered much simpler. Since the plate 12 of the electrode is formed so as to be fairly rigid, it can be easily applied and removed from the skin much more easily than conventional adhesive-coated tapes.

Various of the features of the invention are set forth in the following claims.

What is claimed is:

1. An electrode for use with an instrument such as an electrocardiograph to pick up and convey electrical impulses from an animal body to the instrument, said electrode comprising, in combination:
   A. a normally dry absorbant pad formed of a porous material adapted to be placed in intimate contact with the surface of the skin of the body,
      1. said pad being impregnated with a material in a dry state which becomes electrically conductive when in solution with a selected liquid,
   B. a cup formed of an electrically conductive material having a bottom wall and side walls defining a reservoir for receiving a quantity of the selected liquid,
      1. said bottom wall of said cup having a passageway therein through which liquid can escape from said reservoir,
      2. said cup being disposed with said bottom wall overlying and in intimate contact with said pad and with said passageway in communication with said pad so that liquid escaping from said reservoir will flow onto and be absorbed by said pad and form an electrically conductive solution with the material impregnating said pad,
   C. means for maintaining said pad in intimate contact with the skin of the body and for maintaining said cup in overlying and continuous contacting relation to said pad,
   D. and means for electrically connecting said cup to the instrument.

2. An electrode in accordance with claim 1, wherein said pad is in a compressed state when dry and is adapted to expand against the skin to insure intimate contact between the pad and skin when it aborbs a quantity of the selected liquid.

3. An electrode in accordance with claim 2, wherein said pad when dry is in the form of a compressed sponge-like material.

4. An electrode in accordanc with claim 1, wherein said pad is impregnated as well with a dry wetting agent.

5. An electrode in accordance with claim 1, wherein said means for maintaining said pad in intimate contact with the skin of the body and for maintaining said cup in overlying and contacting relation to said pad comprises a plate provided with an opening extending therethrough large enough to accommodate said pad therein, and means for mounting said cup on said plate with said bottom wall of said cup overlying said pad.

6. An electrode in accordance with claim 5, wherein said means for mounting said cup on said plate includes a collar surrounding said opening at the upper end thereof for receiving said cup, and wherein the inner diameter of said collar and the outer diameter of said cup are dimensioned to provide a force fit therebetween.

7. An electrode in accordance with claim 6, wherein said cup is provided with a flange extending outwardly beyond the and wall thereof, and wherein said collar includes a recess to receive said flange.

8. An electrode in accordance with claim 5, wherein said plate includes an upwardly offset portion to facilitate gripping and handling of said plate.

9. An electrode for use with an instrument such as an electrocardiograph to pick up and convey electrical impulses from an animal body to the instrument, said electrode comprising, in combination:
   A. a normally dry absorbant pad formed of a porous material adapted to be placed in intimate contact with the surface of the skin of the body,
      1. said pad being in a compressed state when dry and being adapted to expand significantly when it has absorbed a quantity of a selected liquid,
   B. a cup formed of an electrically conductive material having a bottom wall and side walls defining a reservoir for receiving a quantity of a selected electrically conductive liquid,
      1. said bottom wall of said cup having a passageway therein through which liquid can escape from said reservoir,
      2. said cup being disposed with said bottom wall overlying and in intimate contact with said pad and with said passageway in communication with said pad so that liquid escaping from said reservoir will flow onto and be absorbed by said pad so as to cause said pad to swell,
   C. means for maintaining said pad in intimate contact with the skin of the body and for maintaining said cup in overlying and contacting relation to said pad when said pad swells incident to absorption of the selected liquid by said pad,
   D. and means for electrically connecting said cup to the instrument.

* * * * *

UNITED STATES PATENT OFFICE
CERTIFICATE OF CORRECTION

Patent No. 3,788,317      Dated January 29, 1974

Inventor(s) James B. McCormick

It is certified that error appears in the above-identified patent and that said Letters Patent are hereby corrected as shown below:

Column 6, line 1 (line 1 of Claim 4), change "accordanc" to --accordance--;

Column 6, line 21 (line 3 of Claim 7), change "and" 1st occurrence to --side--.

Signed and sealed this 17th day of September 1974.

(SEAL)
Attest:

McCOY M. GIBSON JR.                 C. MARSHALL DANN
Attesting Officer                  Commissioner of Patents